Nov. 16, 1926.  C. J. LOFDAHL  1,607,403

SAW

Filed Feb. 16, 1925

WITNESS:
Gus. Hjelm

INVENTOR:
C. J. Lofdahl
BY H. J. Sanders
ATTORNEY.

Patented Nov. 16, 1926.

1,607,403

UNITED STATES PATENT OFFICE.

CHARLES J. LOFDAHL, OF JOLIET, ILLINOIS.

SAW.

Application filed February 16, 1925. Serial No. 9,498.

This invention relates to improvements in saws and more particularly to carpenters' and stair-builders' saws and its object is to provide a saw that can be advantageously used in quarters ordinarily difficult of access, that is adapted to cut either hard or soft wood and that is durable and efficient in use.

With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts throughout the several views.

Figure 1:
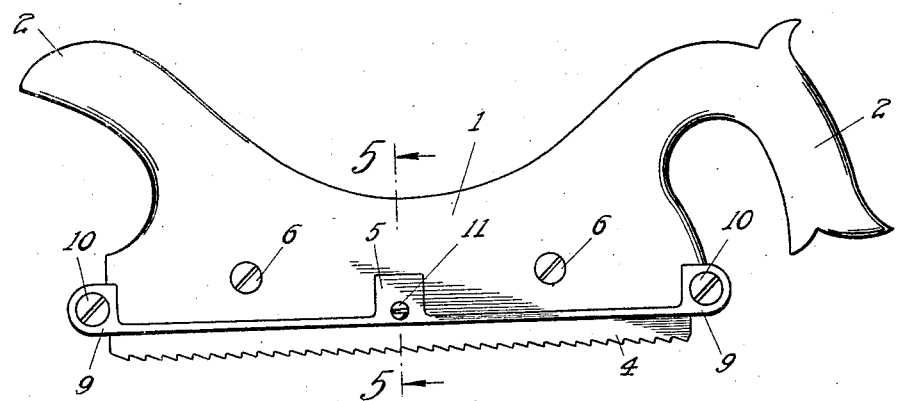
Fig. 1 is a view of the saw in side elevation.
Figure 2:
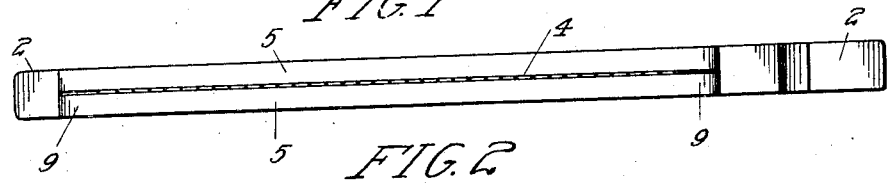
Fig. 2 is an inverted plan view of the saw.
Figure 3:
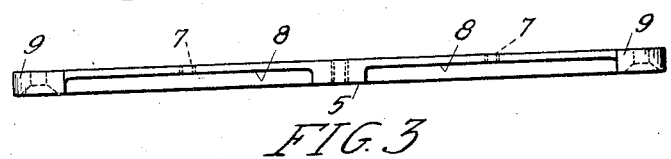
Fig. 3 is an edge view of one of the saw blade clamps.
Figure 4:
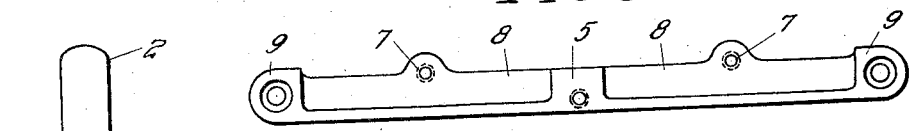
Fig. 4 is a view of Fig. 3 in side elevation.
Figure 5:
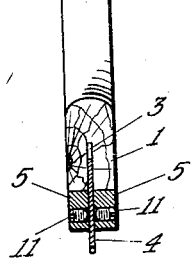
Fig. 5 is a cross section taken on line 5—5 of Fig. 1.
Figure 6:
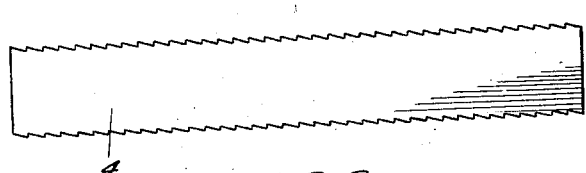
Fig. 6 is a side view of the saw blade employed.

The reference numeral 1 denotes the saw frame provided, or formed, with the handles 2, said frame being formed with the longitudinally extending recess 3 for the blade 4 which is formed with two cutting edges, one set of teeth being coarse and adapted for cutting soft wood rapidly and the other set being fine and adapted for cutting hard wood.

Metal clamps 5 are provided which receive the grooved bottom edge of the saw frame, said clamps being retained in position by the screws 6 which extend through perforations in the frame and perforations 7 in the clamps and engage with the blade 4 to frictionally retain the same in position. Recessed portions 8 of the clamps extend into the frame recess 3, the blade 4 being received between the adjacent walls of said clamps, the ends 9 of said clamps lying immediately beyond the ends of the frame and being connected by the screws 10. Screws 11 also extend through perforations in the clamps at their longitudinal central portions and engage with the saw blade to retain the same in adjusted position.

It is obvious that the blade may be inserted in the frame recess 3 to any desired depth and retained in adjusted position by the screws 6 and 11 so that a cut of any depth desired by the blade is readily had.

What is claimed is:—

A saw comprising a grooved frame having a longitudinal recess in its base edge, clamps formed with spaced recessed portions for disposal in the recess in said frame and with a thickened portion between said recesses for disposal in the frame groove, the ends of said clamps lying immediately beyond the ends of the frame, a reversible saw blade adapted for disposal in the frame recess between said clamps, screws connecting the ends of said clamps, and means for securing said clamps and blade together and to the saw frame.

In testimony that I claim the foregoing as my own I have hereto affixed my signature.

CHARLES J. LOFDAHL.